(12) United States Patent
Durbin et al.

(10) Patent No.: US 9,962,820 B2
(45) Date of Patent: May 8, 2018

(54) BEARING REMOVAL TOOL

(71) Applicant: DURBIN ENTERPRISES LLC, St. Peters, MO (US)

(72) Inventors: Jeff Durbin, O'Fallon, MO (US); Michael J. Durbin, St. Peters, MO (US)

(73) Assignee: Durbin Enterprises LLC, St. Peters, MO (US)

( * ) Notice: Subject to any disclaimer, the term of this patent is extended or adjusted under 35 U.S.C. 154(b) by 107 days.

(21) Appl. No.: 14/563,263

(22) Filed: Dec. 8, 2014

(65) Prior Publication Data

US 2015/0174747 A1 Jun. 25, 2015

Related U.S. Application Data

(63) Continuation-in-part of application No. 14/139,550, filed on Dec. 23, 2013, now abandoned.

(51) Int. Cl.
| | | |
|---|---|---|
| *B25B 27/06* | (2006.01) | |
| *B23P 15/00* | (2006.01) | |
| *F16C 43/04* | (2006.01) | |

(52) U.S. Cl.
CPC ............ *B25B 27/06* (2013.01); *B23P 15/003* (2013.01); *F16C 43/04* (2013.01); *F16C 2322/50* (2013.01); *Y10T 29/53796* (2015.01); *Y10T 29/53843* (2015.01)

(58) Field of Classification Search
CPC ...... B25B 27/06; B23P 15/003; F16C 35/062; Y10T 29/53843; Y10T 29/53935

USPC .................................................. 29/255, 276
See application file for complete search history.

(56) References Cited

U.S. PATENT DOCUMENTS

| | | | | | |
|---|---|---|---|---|---|
| 1,382,835 | A | * | 6/1921 | Johnson | ................... B25B 27/06 29/263 |
| 3,585,704 | A | * | 6/1971 | Schroeder | ................. B25B 7/02 269/2 |
| 3,781,963 | A | * | 1/1974 | Felser, Jr. | ............. B25B 27/023 29/282 |
| 4,167,057 | A | * | 9/1979 | Traynor | .................. B25B 27/06 29/283 |
| 4,372,024 | A | * | 2/1983 | Shevada | ................ B25B 27/062 29/260 |
| 4,429,447 | A | * | 2/1984 | Davis | ...................... B25B 27/06 29/262 |
| 4,724,608 | A | * | 2/1988 | Parrott | .................. B25B 27/023 29/253 |
| 5,509,186 | A | * | 4/1996 | Straut | ................... B25B 27/023 29/256 |
| 6,886,228 | B1 | * | 5/2005 | Chen | ..................... B25B 27/062 29/255 |
| 8,256,081 | B2 | | 9/2012 | Fridman | |

(Continued)

*Primary Examiner* — Christopher M Koehler
*Assistant Examiner* — Henry Hong
(74) *Attorney, Agent, or Firm* — Senniger Powers LLP

(57) ABSTRACT

A tool for removing a seated bearing from a bearing housing of a machine having a rotatable shaft, such as a squirrel cage blower, the bearing removal tool being easily positionable within the assemble housing aft of the bearing and including a striking surface at partially circumferential relation to the shaft for exerting a generally normal force against the bearing sufficient to overcome the frictional force between the bearing and the shaft when the tool is moved quickly and sharply along the shaft against the aft side of the bearing.

20 Claims, 17 Drawing Sheets

(56) References Cited

U.S. PATENT DOCUMENTS

| | | | |
|---|---|---|---|
| 2010/0077584 A1* | 4/2010 | Fridman | B25B 27/062 29/244 |
| 2010/0320663 A1* | 12/2010 | Wasinger | B25B 7/02 269/8 |
| 2011/0030189 A1* | 2/2011 | Frias | B25B 27/06 29/426.5 |
| 2013/0047398 A1* | 2/2013 | Zaccaria | B25B 27/10 29/426.1 |

* cited by examiner

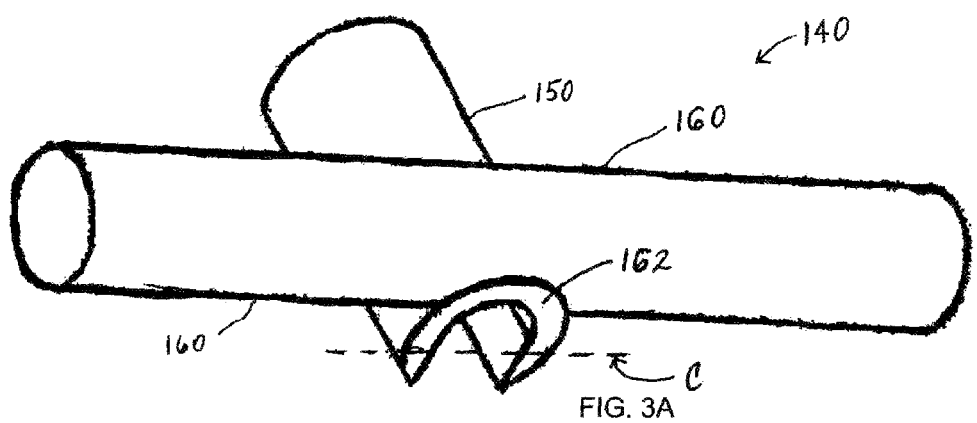
FIG. 3A
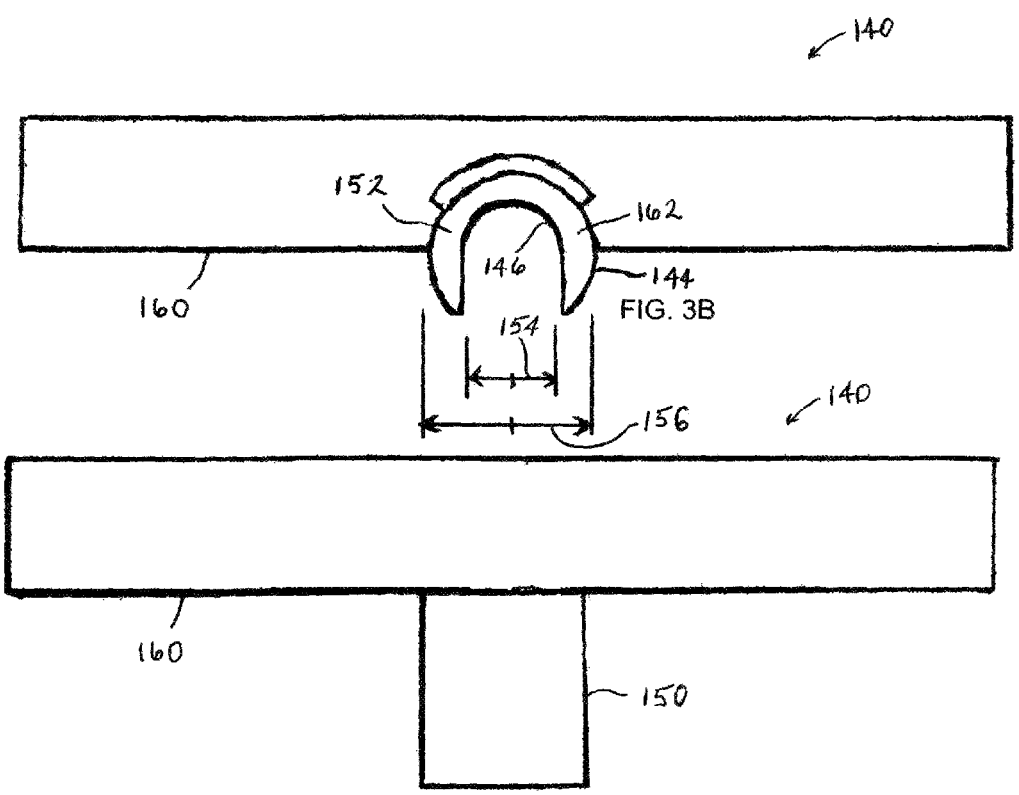
FIG. 3B
FIG. 3C

BEARING REMOVAL TOOL

This application is a continuation-in-part of co-pending U.S. application Ser. No. 14/139,550, filed Dec. 23, 2013, which application claims the benefit of U.S. Provisional Application No. 61/740,557, filed Dec. 21, 2012.

TECHNICAL FIELD

This invention relates generally to apparatus for removing a worn or damaged bearing from a rotatable shaft, and more specifically to a bearing removal tool for removing worn or damaged bearings that is easily positionable within the assembly housing aft of the bearing and includes a striking surface in partially circumferential relation to the shaft for exerting a generally normal percussive force against the bearing when the tool is moved quickly and sharply along the shaft against the aft side of the bearing.

BACKGROUND ART

U.S. application Ser. No. 14/139,550, filed Dec. 23, 2013, and U.S. Provisional Application No. 61/740,557, filed Dec. 21, 2012, are incorporated herein by reference in their entirety.

Heavy machinery, such as construction equipment, agricultural machines, and heating, ventilation, and air condition (HVAC) units typically use ball bearings to reduce the amount of friction between moving parts. Generally, a ball bearing assembly, or bearing, includes an outer race, an inner race, and a plurality of ball bearings disposed between and engaging the inner and outer races to permit free rotation therebetween. One common use of this type of bearing is found in a squirrel cage blower. The blower is supported on a rotating shaft which is in turn supported by bearings within a blower housing. Support arms extend from the blower housing to a bearing housing at the end of the shaft. Normal wear and exposure to the elements requires eventual replacement of the bearings. During use, however, bearings tend to become firmly seated or rusted on the shaft requiring considerable force to remove them.

Various methods have been used to remove bearings seated on the shaft in this manner, and each of these methods has its drawbacks. The bearing housing typically makes prying the bearing from the outside unsuccessful, and reaching inside the blower housing with tools to apply outward force is difficult given the limited space and placement of the support arms. Another method includes reaching inside the blower housing with a torch to heat the bearing in an effort to unseat it, and then apply the outward force. In cases that are more difficult, the torch is used to cut the bearing from the shaft. Each of these methods may result in damage to the shaft or the surrounding housing. In addition, these methods could result in safety concerns. In any case, they are labor intensive and time consuming, and thus expensive. Moreover, if an asymmetrical force is applied to the bearing during removal, extraction may become even more difficult.

Another technique used to remove a bearing or the like from a shaft uses a bearing puller. Reference in this regard, Shevada, U.S. Pat. No. 4,372,024 discloses a split pusher portion positioned behind the bearing and a split puller portion positioned outside the housing. As seen in FIG. 1 of the patent, pull bolts 20 are positioned in opposing slots 19 and 22 of the puller and pusher portions, respectively, and a central bolt 21 positioned against the shaft is advanced to urge the bearing from the housing. The pusher portion is assembled inside the blower housing using four bolts, but nothing appears to prevent lateral movement of pull bolts 20 in the slots 19 and 22. If a bearing was firmly seated on the shaft, it seems possible that as the pressure from advancing central bolt 21 increases, pull bolts 20 could slide laterally outward in slot 22, possibly disengaging therefrom.

When the end of the shaft is not accessible because a hub surrounds the bearing, another type of bearing pusher is sometimes used. Reference in this regard, Straut, U.S. Pat. No. 5,509,186 discloses affixing a split anchor block portion rearward of a split pusher block behind the bearing and inside the blower housing. As seen in FIG. 1 of the patent, pushing members, or bolts 16, are advanced through the anchor block portion 15 applying pressure against the pushing block 19 for pushing the bearing off the shaft. According to FIGS. 3 and 4, the ends of bolts 16 are sized and shaped to engage the pushing block 19 at sockets 46 to prevent lateral movement thereof. Because the pressure is applied at sockets 46, it seems likely that the bearing will be subjected to asymmetrical forces as the top bolt is advanced and then the bottom bolt is advanced. This torsion of the bearing could actually make it more difficult to remove from the shaft. Another drawback of this bearing pusher is that it must be assembled and used inside the blower housing where space and accessibility are limited.

Accordingly, what is sought is a bearing removal tool which overcomes at least one of the problems, shortcomings or disadvantages set forth above.

SUMMARY OF THE INVENTION

What is disclosed is a bearing removal tool which overcomes at least one of the problems, shortcomings or disadvantages set forth above.

Although the invention is depicted and described for use in a squirrel cage blower assembly, it is contemplated that the present invention can be used in other applications for removing a seated bearing from a machine including a rotatable shaft. According to a preferred embodiment of the invention, the tool has a striking element including a concave portion which extends generally perpendicularly from a handle portion. The striking element terminates in a striking surface and is sized and shaped to allow placement on the shaft within the assembly housing aft of the bearing. More particularly, the striking section includes a ring section with an inside radius larger than a radius of the shaft and an outside radius smaller than a radius of the bearing housing. When the tool is pulled axially along the shaft with a strong, sharp force, the striking surface will impart a generally normal force to the aft side of the bearing generating a force sufficient to overcome the frictional force between the bearing and the shaft to allow removal of the bearing from the shaft. When operating the tool, it is possible to impart a larger force if the striking element is allowed to pass through the bearing housing. Thus, the striking surface has an inside dimension larger than the shaft and an outside dimension smaller than the bearing housing.

According to a preferred aspect of the invention the striking element is U-shaped, and the ring section of the striking surface encircles between about one half and about three fourths of the shaft.

According to another preferred aspect of the invention, the striking element includes a C-shaped outside surface and a U-shaped inside surface and the ring section of the striking surface encircles between about one half and about three fourths of the shaft. In addition to the advantages imparted by the U-shape striking element, the C-shape of the outside surface allows the legs of the U-shaped inside surface to extend further.

According to another preferred embodiment of the invention, the bearing removal tool includes a first body portion having a first inside surface including a first concave extension centrally disposed between first handle sections and a second body portion having a second inside surface including a second concave extension centrally disposed between second handle sections. In use, the first body portion and the second body portion are joined inside the assembly housing of a machine aft of the bearing. The first inside surface abuts the second inside surface, and the first handle sections and the second handle sections align and interconnect forming handles. The first concave extension and the second concave extension unite in a cylindrical member encircling an axial extent of the shaft and terminating in a striking surface. When moved in a sharp quick motion against the aft side of the bearing, the axial forces exerted by the striking surface against the bearing dislodge it from within the bearing housing on the shaft.

According to a preferred aspect of the invention, the first body portion and the second body portion include a protrusion and an aperture configured for alignment for interconnecting the first handle sections and the second handle sections. In addition, a band, or a spring collar may be used to allow the tool to be mounted on the shaft and remain thereon temporarily without manually holding the tool in place.

One of the primary advantages of the tool of the present invention is the ability to obtain access to and apply an axial force against the aft side of the bearing. This is because when the bearing removal tool is mounted inside the assembly housing, the cylindrical member is disposed on the shaft for movement in a direction parallel to the axis of rotation of the shaft to impact the aft side of the bearing. This type of force is the most desirable for dislodging the bearing quickly without cutting or heat. In other words, when tool is moved with a sharp quick motion towards the bearing, the cylindrical member moves along the shaft so the striking surface exerts an axial force, or a force parallel to the axis of rotation of the shaft, for dislodging the bearing.

For optimum effectiveness, it is preferable that the striking surface impact at least an inner race and in some cases part of an outer race of the bearing. Accordingly, the area of the striking surface is a function of the overall diameter or the area of the inner and/or outer race. According to one feature, the striking surface has an area approximately equal to or greater than an area of the inner race of the bearing. According to another feature, the striking surface may preferably have an area approximately equal to or less than an area of the outer race of the bearing. It is important to note that in either case, the striking surface has an overall diameter that is less than a diameter of the bearing housing, so the striking surface of the cylinder is able to pass through the bearing housing when the tool is sharply and quickly moved against the aft side of bearing for dislodging the bearing from the shaft.

According to yet another preferred embodiment of the present invention, the first body portion and the second body portion include notches which align for defining apertures for receiving handles. The handles, for example, may be eye bolts or other well known types of handles mounted to extend outwardly of the assembly housing.

According to another preferred aspect of the invention, the bearing removal tool may include a body portion having two members each including a curved receiving section disposed centrally between outer sections. The tool also includes at least one insert portion having two members, each including a curved collar section sized and shaped for receipt in the curved receiving section and a semi-circular section. In use, the two members of the insert portion are joined within the assembly housing aft of the bearing with the collar sections inserted the receiving sections of the two members of the body portion, respectively. The semi-circular sections abut around the shaft to form a cylindrical member having a terminal end defining a striking surface with a thickness extending radially from the shaft.

According to another feature of the invention, the bearing removal tool may include a plurality of insert portions. Each insert portion includes collar sections sized and shaped for receipt in the receiving sections of the body portion and semi-circular sections sized for encircling a plurality of shaft diameters. The insert portion may be secured in the body portion using conventions attachment methods, such as, but not limited to, tape or hook and loop fabric.

BRIEF DESCRIPTION OF THE DRAWINGS

FIG. 3A a perspective view of the bearing removal tool of FIG. 1;

FIG. 3B a front view of the bearing removal tool of FIG. 1;

FIG. 3C a top view of the bearing removal tool of FIG. 1;

DETAILED DESCRIPTION OF THE INVENTION

Figure 1:
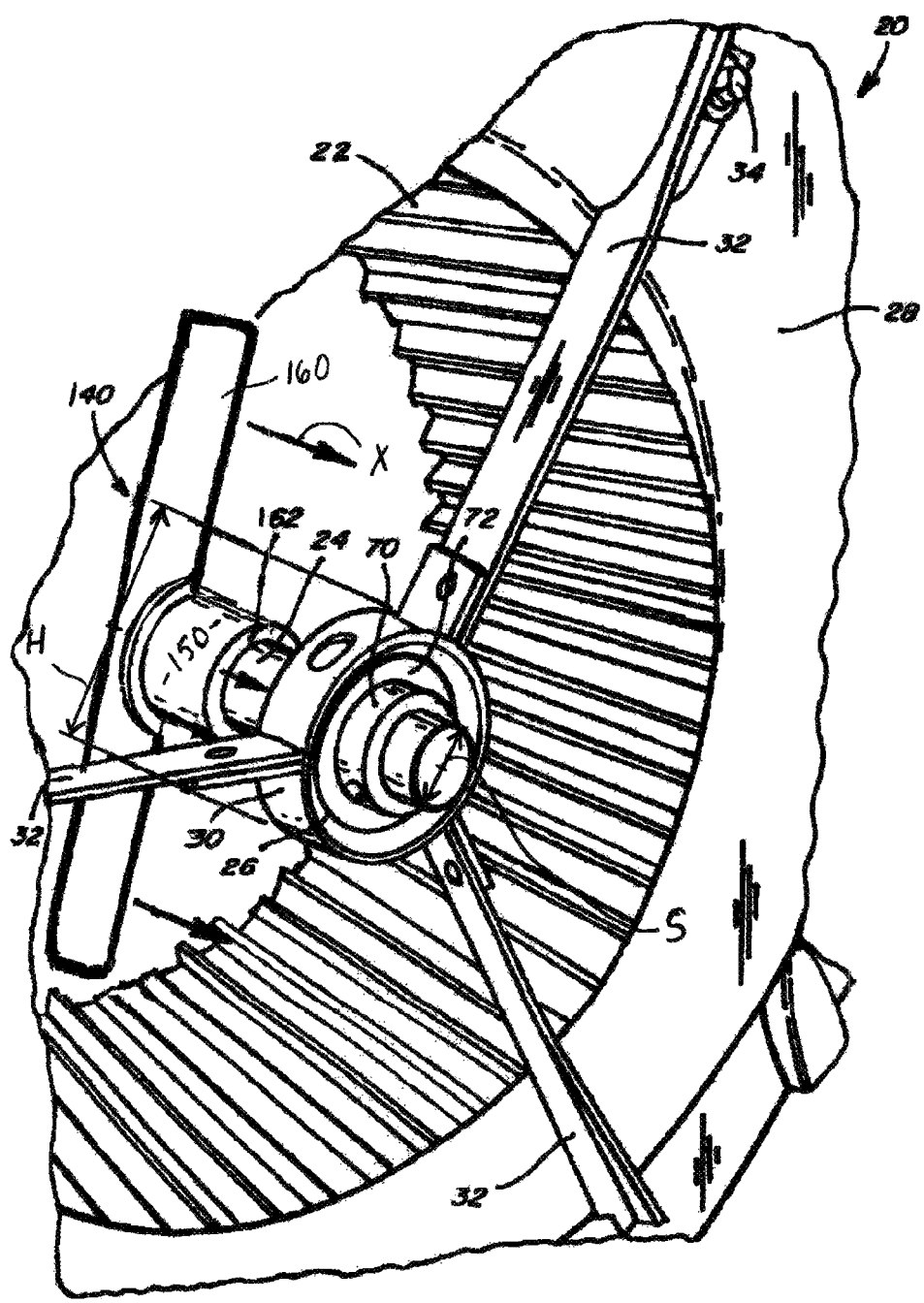
FIG. 1 is a perspective view of a portion of a squirrel cage blower assembly including a preferred embodiment of bearing removal tool of the invention.
Figure 4:
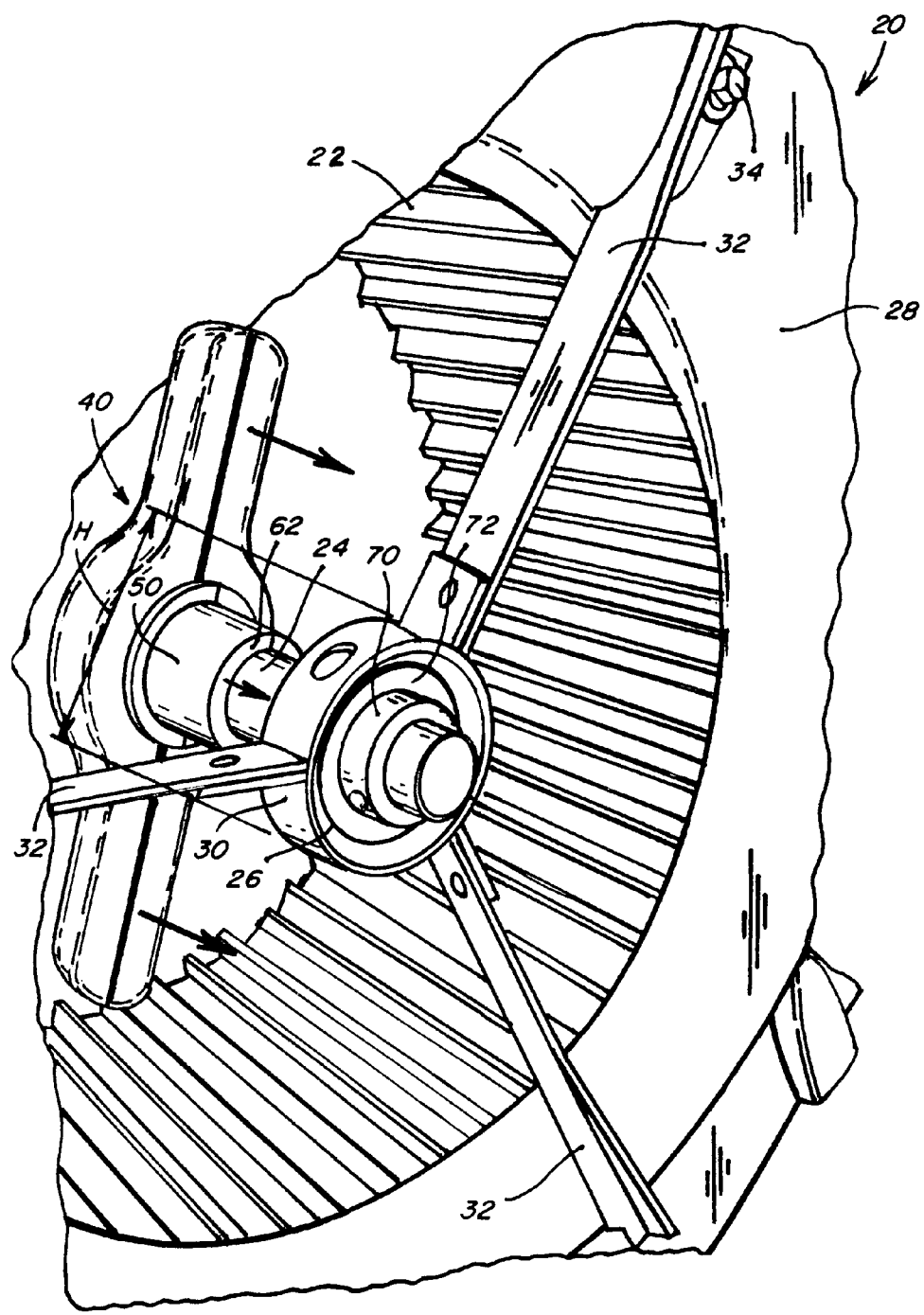
FIG. 4 is a perspective view of a portion of a squirrel cage blower assembly including another preferred embodiment of the bearing removal tool of the invention.
Figure 7:
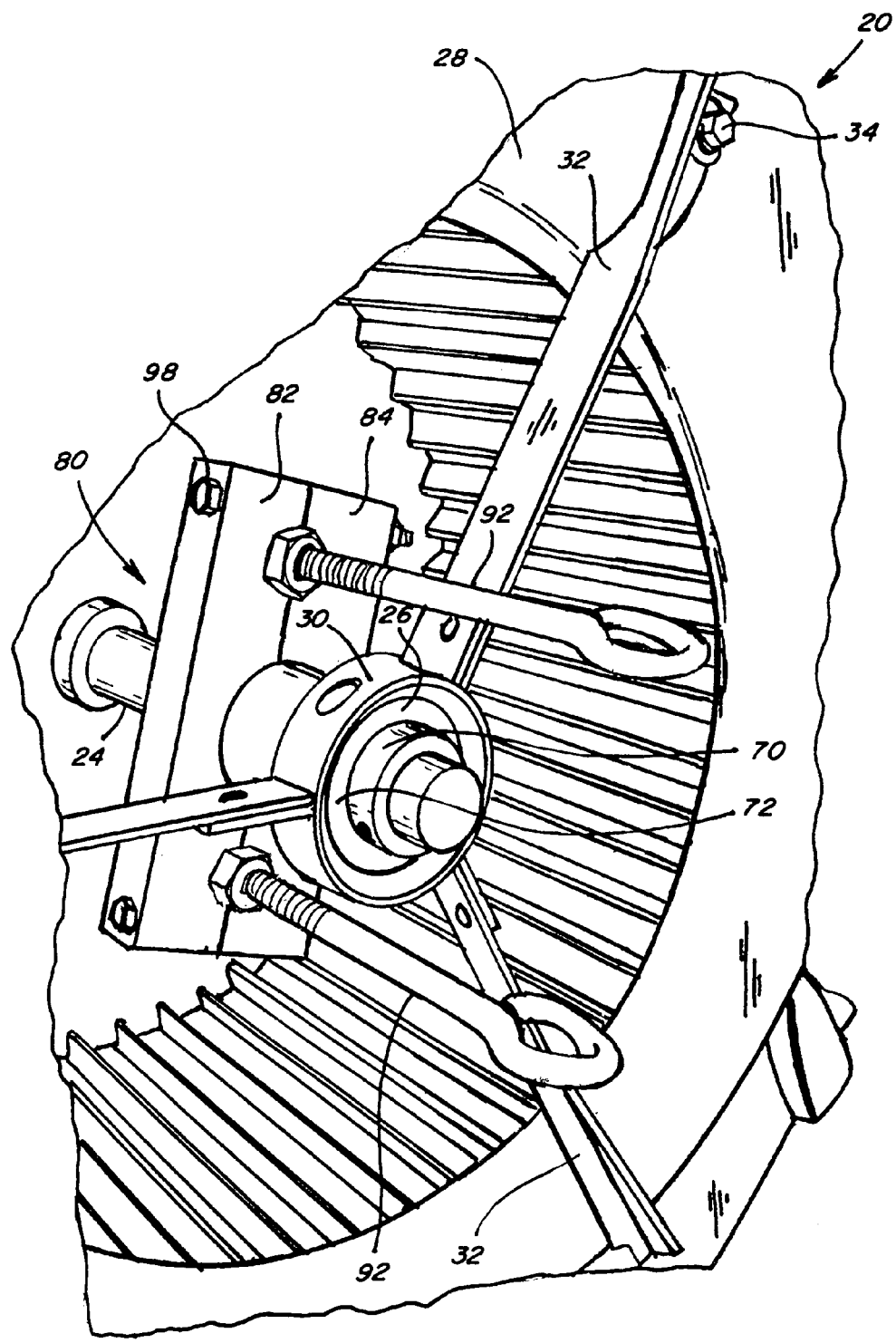
FIG. 7 is a perspective view of a portion of a squirrel cage blower assembly including yet another preferred embodiment of a bearing removal tool of the invention.
Figure 8:
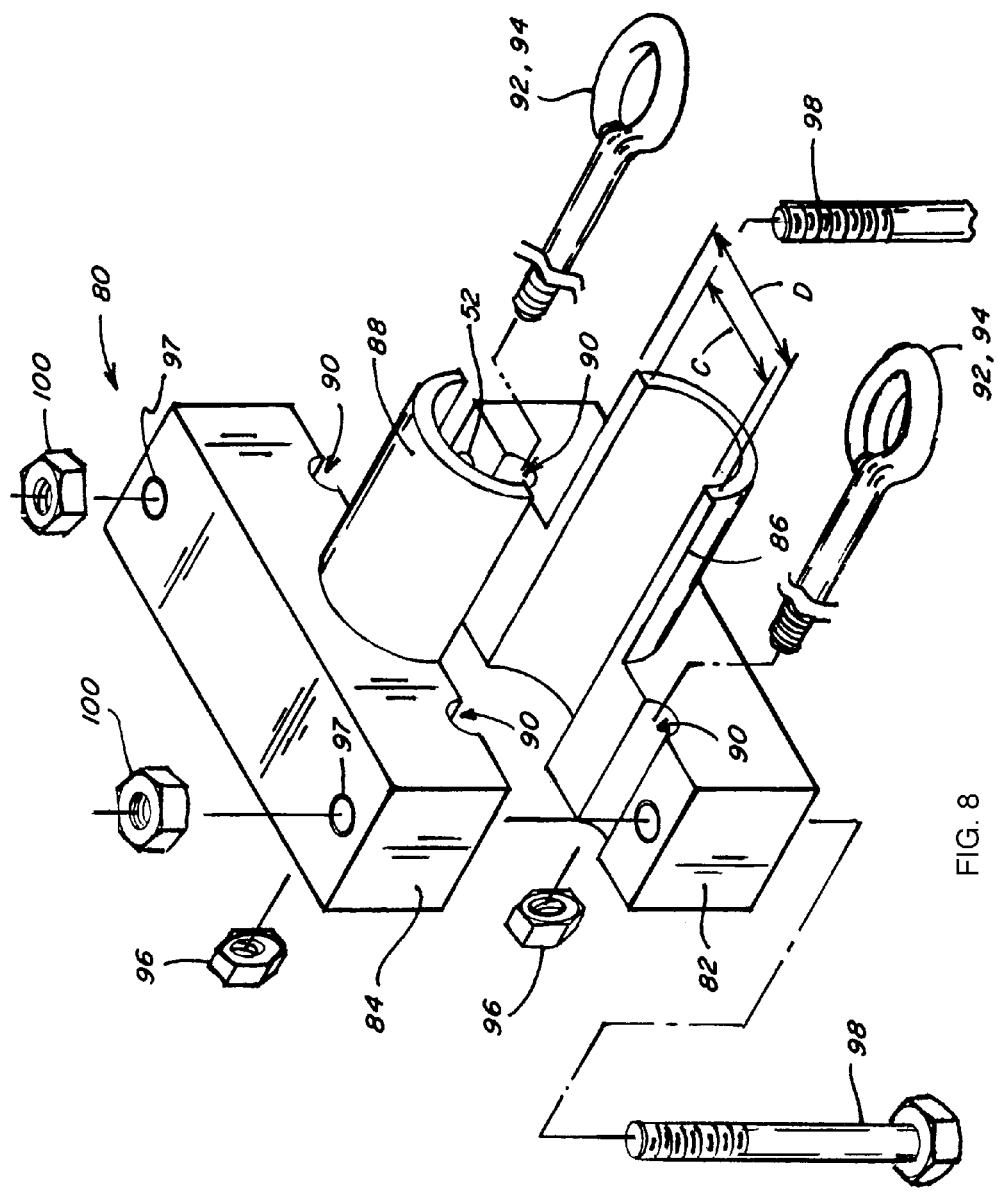
FIG. 8 is an exploded perspective view of the bearing removal tool of FIG. 7.
Figure 9:
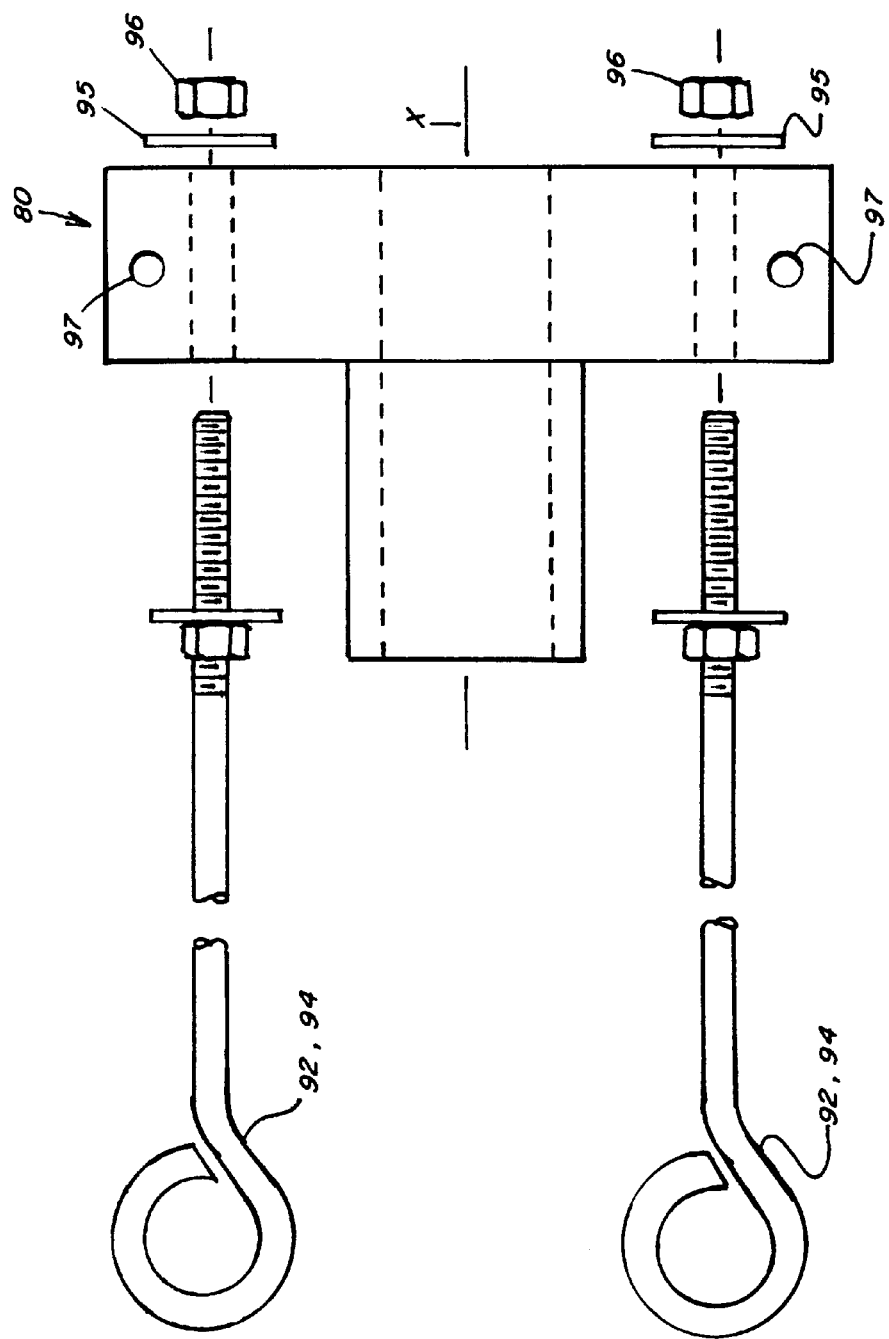
FIG. 9 is an exploded top view of the bearing removal tool of FIG. 7.
Figure 10:
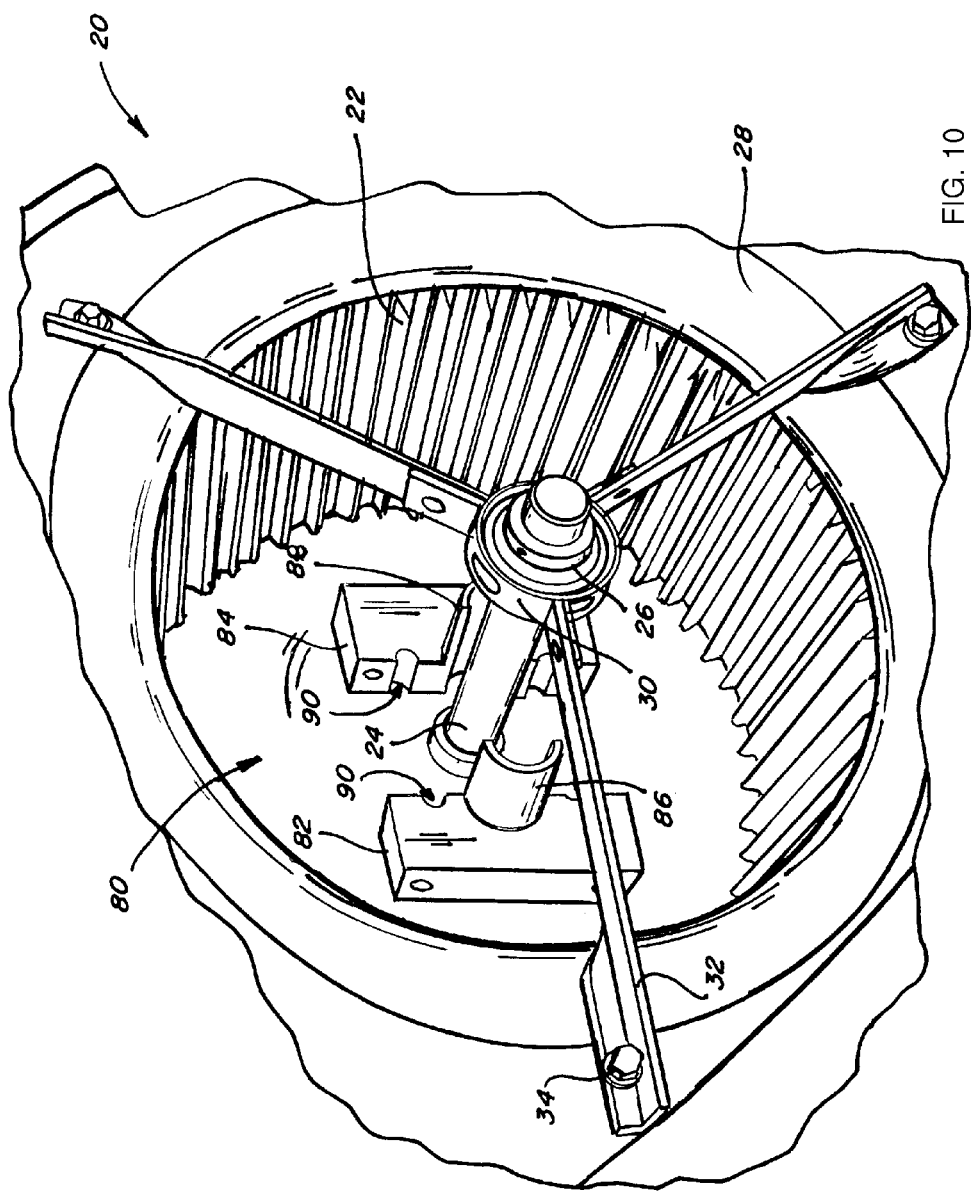
FIG. 10 is a perspective view of the squirrel cage blower assembly showing part of the bearing removal tool of FIG. 7 partially assembled.
Figure 11:
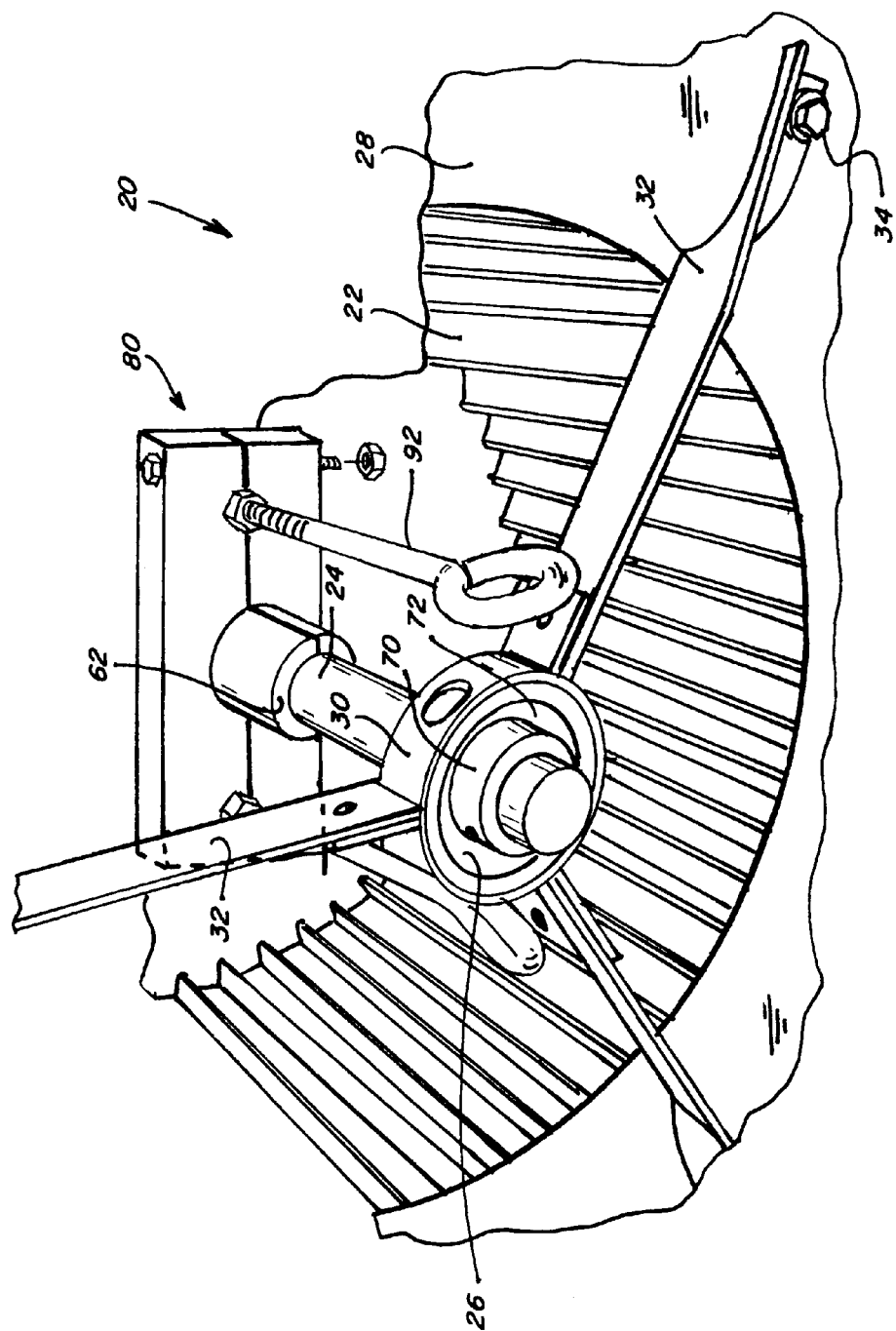
FIG. 11 is a partial cutaway view of the blower showing the bearing removal tool of FIG. 7 mounted for use.
Figure 12:
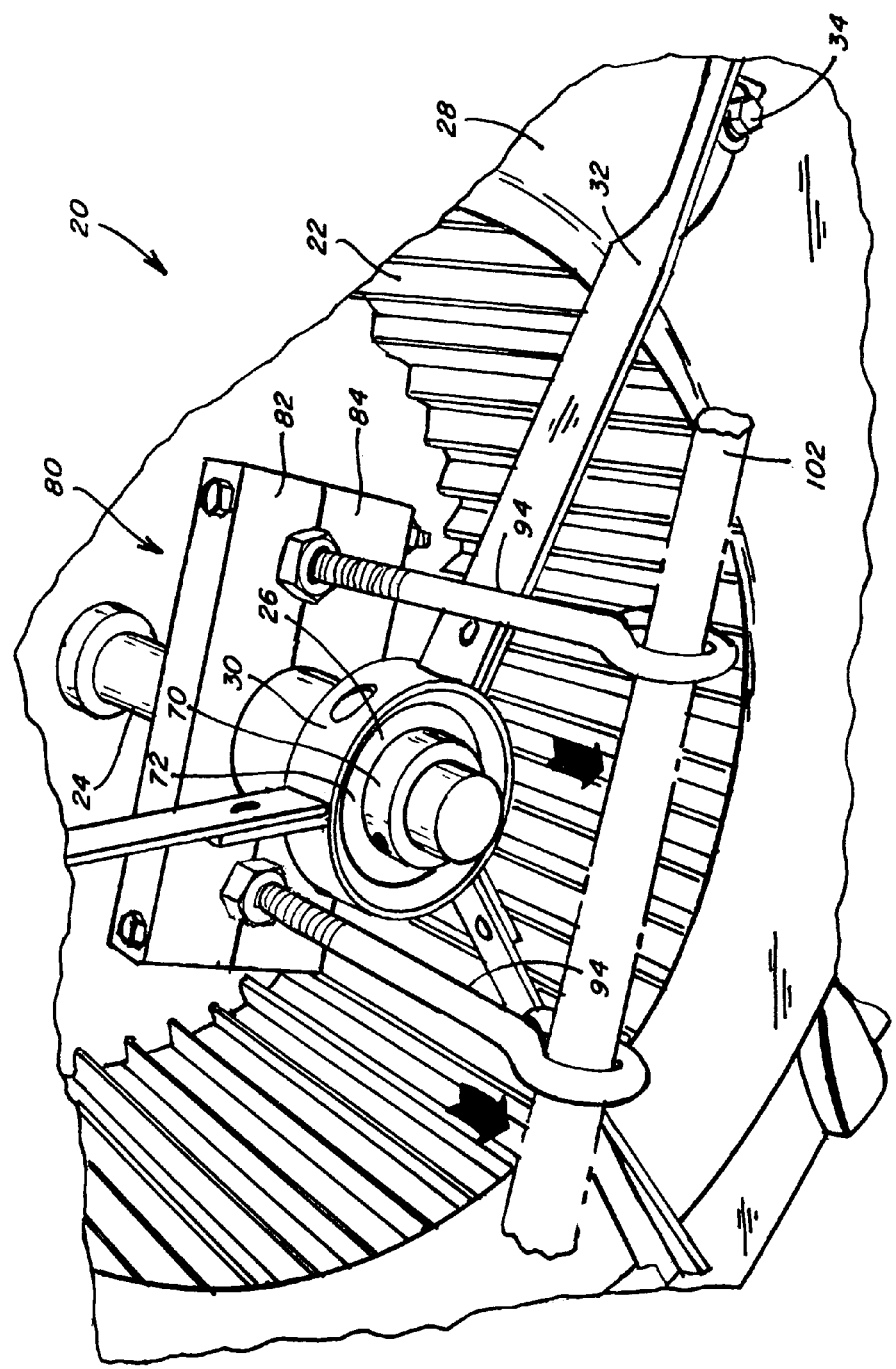
FIG. 12 is a partial cutaway view of the blower showing the bearing removal tool of FIG. 7 mounted for use using a grip.

Turning now to the drawings, wherein FIGS. 1, 4 and 7 depict portions of a representative squirrel cage blower assembly 20 for use with a bearing removal tool of the present invention. Assembly 20 includes a squirrel cage blower 22 disposed within a blower assembly housing 28. The blower 22 includes a shaft 24 supported for rotation by a bearing 26 within a bearing housing 30 which is connected to blower assembly housing 28 by support arms 32 at bolts 34 in the well-known manner. Although the invention is described for use in a squirrel cage blower assembly, it is contemplated that the present invention can be used in other applications for removing a worn bearing from a machine including a rotating shaft.

Figure 2:
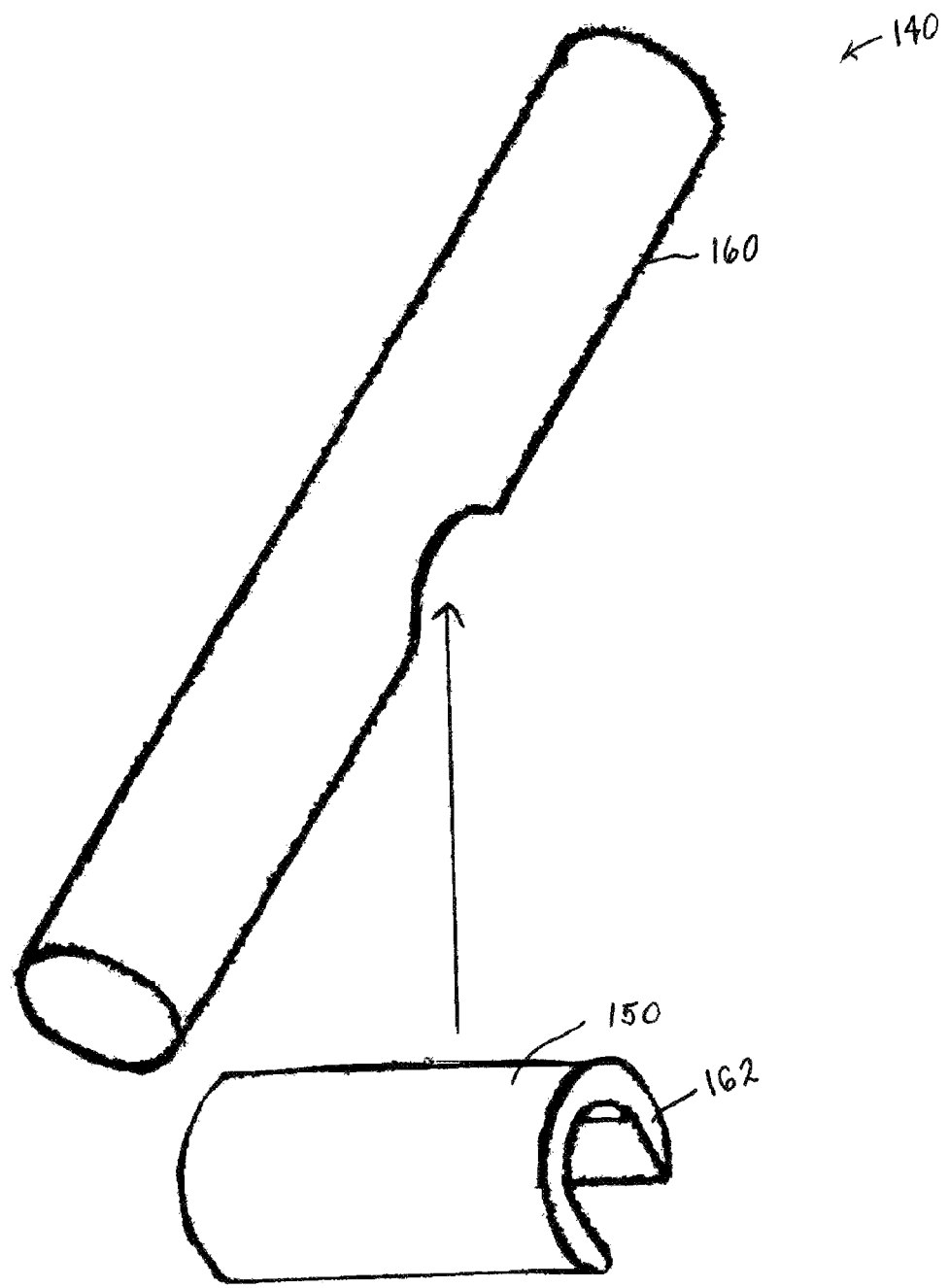
FIG. 2 is an exploded perspective view of the bearing removal tool of FIG. 1.

According to a preferred embodiment of the invention, and referring also to FIGS. 2 and 3, a bearing removal tool 140 has a striking element 150 including a concave portion which extends generally perpendicularly from a handle portion. The striking element 150 terminates in a striking surface 162 and is sized and shaped to allow placement on the shaft 24 within the assembly housing 28 aft of the bearing 26. More particularly, the striking section 162 includes a ring section 152 with an inside radius 154 larger than a radius of the shaft 24 and an outside radius 156 smaller than a radius of the bearing housing 30 (see FIG. 1 for diameters of shaft S and bearing housing H). When the tool 140 is pulled axially along the shaft 24 in a direction parallel to the axis of rotation of the shaft X with a strong, sharp force, the striking surface 162 will impart a generally normal force to the aft side of the bearing 26 generating a force sufficient to overcome the frictional force between the bearing 26 and the shaft 24 to allow removal of the bearing 26 from the shaft 24. When operating the tool 140, it is possible to impart a larger force if the striking element 150 is allowed to pass through the bearing housing 30. Thus, the striking surface has an inside dimension larger than the shaft and an outside dimension smaller than the bearing housing.

According to a preferred aspect of the invention the striking element 150 is U-shaped, and the ring section 152 of the striking surface 162 encircles between about one half and about three fourths of the shaft. (See FIG. 3A cutting striking element 150 at line C) Provided the striking surface 162 impacts the majority of the aft surface of the bearing 26 with sufficient force to overcome the frictional force holding the bearing 26 in place, the bearing 26 will typically become unseated. This happens because the force imparted in the direction of the shaft 24 against the majority of the surface area of the bearing 26 from the bottom and sides of the U-shape is much larger than the torque concentration at the smaller portion of the bearing 26 at the opening of the U-shape. The U-shape of the striking element 150 is also advantageous because the tool 140 can be positioned with one hand at virtually any angle on the shaft 24. In addition, it can be placed over the shaft 24 and remain in place hands free if the need should arise.

According to another preferred aspect of the invention, the striking element includes a C-shaped outside surface 144 and a U-shaped inside surface 146 and the ring section of the striking surface encircles between about one half and about three fourths of the shaft. In addition to the advantages imparted by the U-shape striking element, the C-shape of the outside surface allows the legs of the U-shaped inside surface to extend further thereby contacting more surface area of the bearing 26. According to a feature of this embodiment of the invention, the striking element 150 is permanently affixed to the handle 160. In addition, the tool 140 can be made to include a striking element 150 that is suitable for any size shaft.

According to another feature of the invention, the striking element 150 may be removable and replaceable with a striking element sized for another size shaft.

It may be observed that the handle 150 does not level with the shaft 26 when the tool 140 is placed on the shaft 26. This creates a distance between the handle 150 and the shaft of about one half of the inside radius of the ring section 154 which may present a small amount of torque at the bearing 24. Even though the force generated by movement of the handle 150 is slightly separated from the center of the shaft 24, provided the striking surface 162 impacts the majority of the aft surface of the bearing 26 with sufficient force to overcome the frictional force holding the bearing 26 in place, the bearing 26 will typically become unseated. Again the force imparted in the direction of the shaft X against the majority of the surface area of the bearing 26 from the bottom and sides of the U-shape is much larger than the torque concentration at the smaller due to small distance between the handle 150 and the shaft 26.

Figure 5:
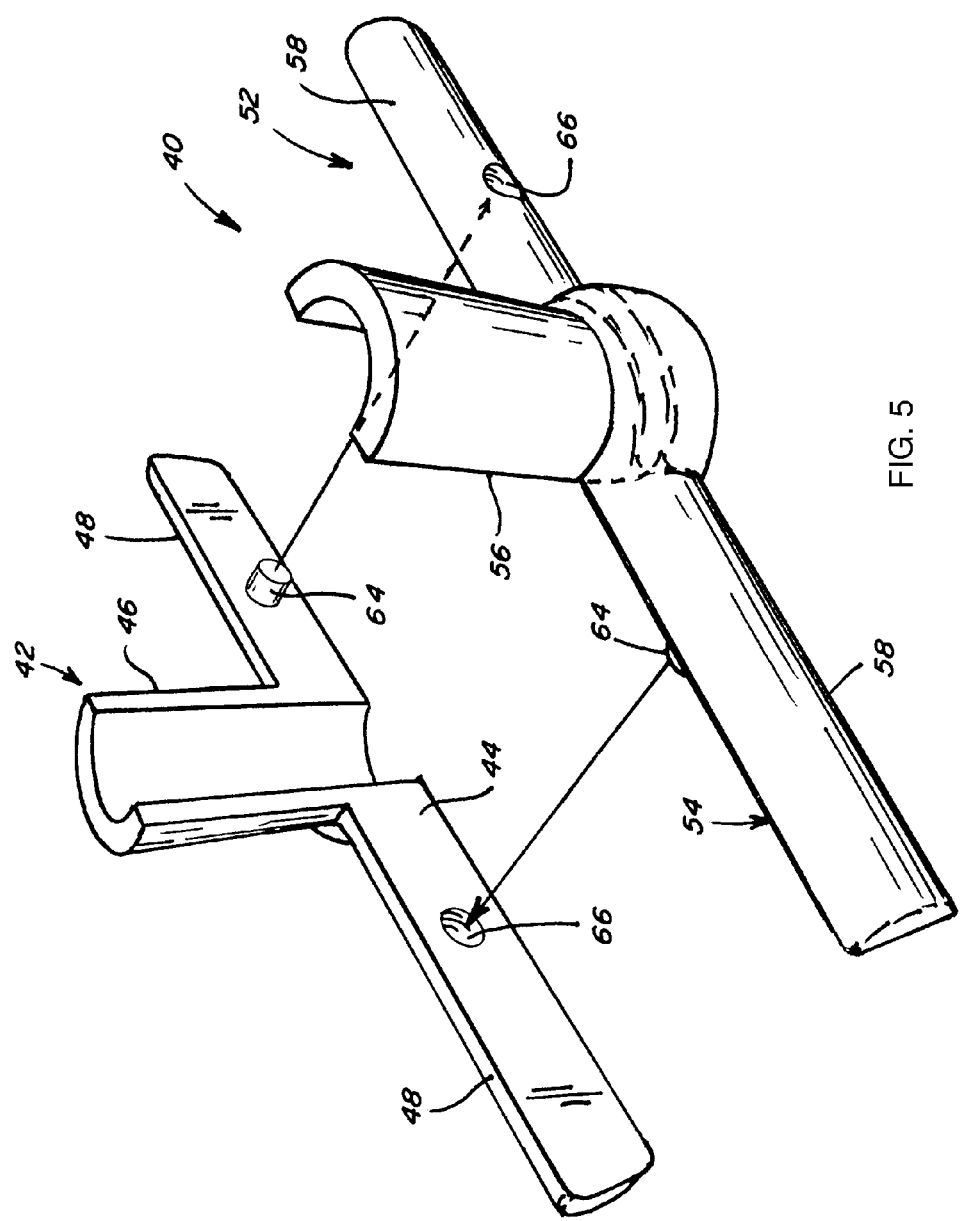
FIG. 5 is an exploded perspective view of the bearing removal tool of FIG. 4.
Figure 6:
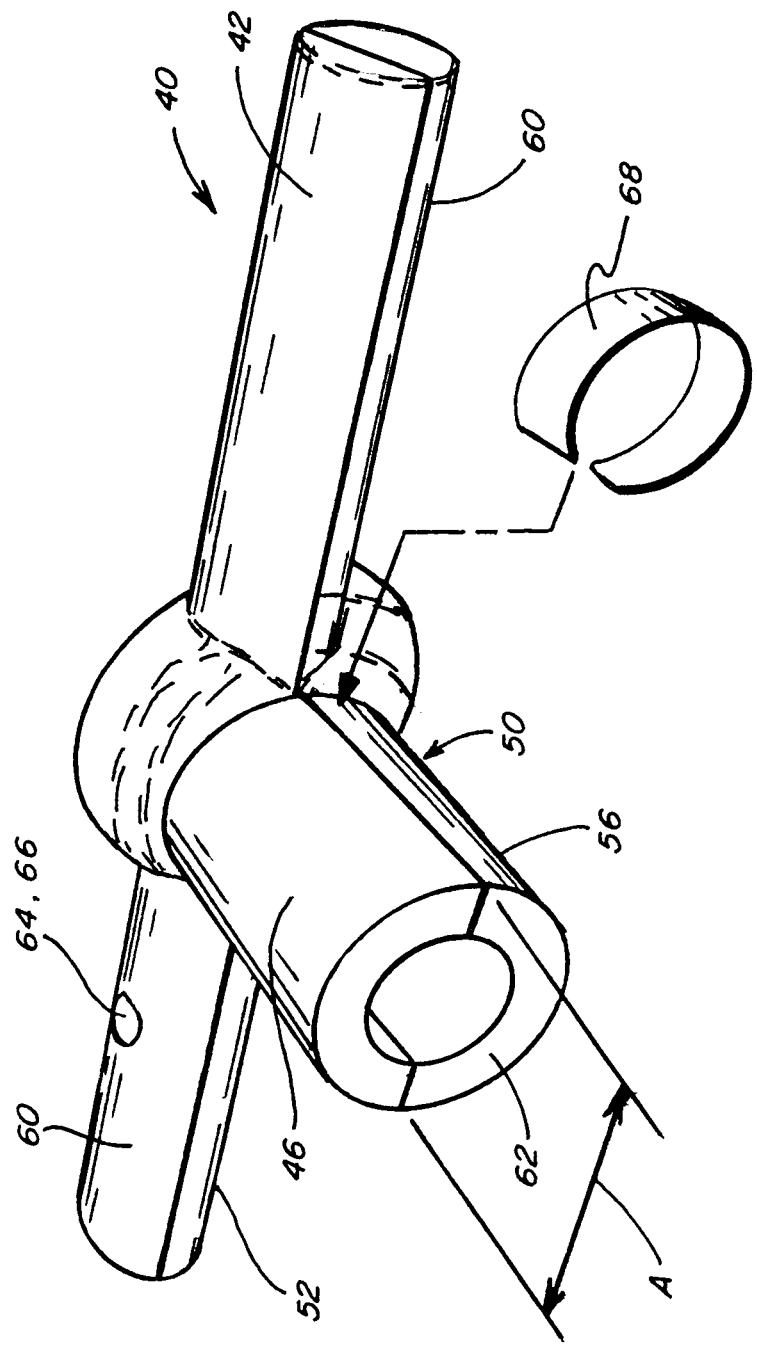
FIG. 6 a perspective view of the bearing removal tool of FIG. 4.

Referring also now to FIGS. 5 and 6, a bearing removal tool 40 according to another preferred embodiment of the present invention includes a first body portion 42 having a first inside surface 44 including a first concave extension 46 centrally disposed between first handle sections 48 and a second body portion 52 having a second inside surface 54 including a second concave extension 56 centrally disposed between second handle sections 58. In use, the first body portion 42 and the second body portion 52 are joined inside the assembly housing 28 aft of the bearing 26 such that the first inside surface 44 abuts the second inside surface 54 and the first handle sections 48 and the second handle sections 58 align and interconnect forming handles 60. The first concave extension 46 and the second concave extension 56 unite in a cylindrical member 50 encircling an axial extent of the shaft 24 and terminating in a striking surface 62 for exerting a percussive force against the bearing 26 for dislodging the bearing 26 from within the bearing housing 30 on the shaft 24.

According to a preferred aspect of this embodiment of the invention, the first body portion 42 and the second body portion 52 include a protrusion 64 and an aperture 66 configured for alignment for interconnecting the first handle sections 48 and the second handle sections 58. It may be desirable to assemble the tool 40 on the shaft 24 within the assembly housing 28 and place a spring collar 68 around cylindrical member 50 to maintain the alignment and interconnection of the handles 60. This will allow the user to leave the tool 40 mounted on the shaft 24 temporarily without manually holding the tool 40 in place.

When the tool 40 is mounted inside the assembly housing 28, cylindrical member 50 is disposed on the shaft 24 for movement in a direction parallel to the axis of rotation of the shaft X to impact the aft side of the bearing 26. As explained above, it is desirable to exert this type of axial force for dislodging the bearing 26 from the shaft 24. In other words, when tool 40 is moved with a sharp quick motion towards the bearing 26, the cylindrical member 50 moves along the shaft 24 so the striking surface 62 exerts an axial force, or a force parallel to axis X, for dislodging the bearing 26.

Figure 17:
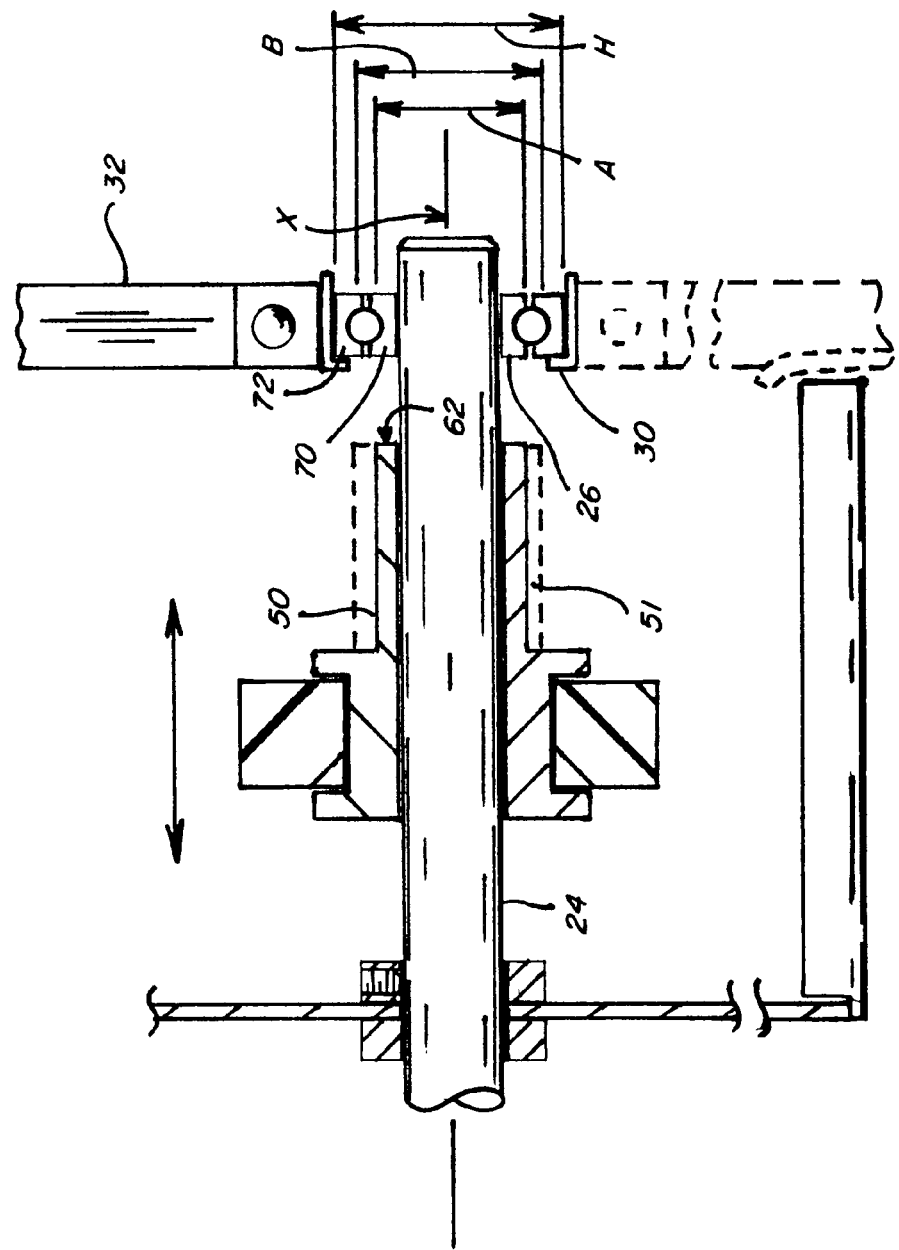
FIG. 17 is a partial cross sectional view of the present invention mounted for use.

Referring also to FIG. 17 it is preferable that the striking surface 62 impact at least an inner race 70 and in some cases part of an outer race 72 of the bearing 26. Accordingly, the area of the striking surface 62 is a function of the overall diameter or the area of the inner and/or outer race 70, 72. Preferably, the striking surface 62 has an area approximately equal to or greater than an area of the inner race 70 of the bearing 26 as seen at cross section of cylinder 50 having an overall diameter denoted by arrow A. In addition, the striking surface 62 may preferably have an area approximately equal to or less than an area of the outer race 72 of the bearing 26 as also shown in cross section and in dashed lines as cylinder 51 having an overall diameter denoted by arrow B. It is important to note that when the striking surface 62 has an area less than or equal to that of the outer race 72, the overall cylindrical member 50, 51 has a diameter A, B, respectively, which is less than a diameter of the bearing housing, denoted by arrow H, and the striking surface 62 of the cylinder is able to pass through the bearing housing 30 when the tool 40 is sharply and quickly moved against the aft side of bearing 26 dislodging the bearing 26 from the shaft 24.

Referring also to FIGS. 8 through 12, and according to yet another preferred embodiment of the tool 80 of the present invention, a first body portion 82 and a complementary second body portion 84 include a first curved member 86 and a second curved member 88 extending therefrom, respectively. In use, the first and second body portions 82, 84 are arranged on shaft 24 behind bearing 26. The first and second body portions 82, 84 also include notches 90 such that when the first body portion 82 the second body portion 84 are joined, the notches 90 coordinate for defining apertures for receiving handles 92. For illustration purposes, the handles 92 are represented as eye bolts 94 fastened with washers 95 and nuts 96. The user may choose to grasp the eye bolts 94 along the bolt portion or at the eye of the bolt to move tool 80 with a sharp quick motion along shaft 24 against bearing 26 to release bearing 26 from shaft 24. While eye bolts have been used here to illustrate handles 92, it is contemplated that other well-known types of handles and attachment techniques would be suitable for use as handles as well.

In order for the tool 80 to temporarily remain on the shaft 24 within the assembly housing 28, the first body portion and the second body portion may include openings 97 for receiving connecting bolts 98 which may be tightened by nuts 100. It should be understood that use of a bolt and nut for attachment of the body portions is illustrative and non-limiting, as it is contemplated that the first and second body portions may be attached using a number of other well-known techniques.

According to an aspect of the invention, a length of pipe, wood, or the like can be inserted through the eyes of eye bolt 94 to create a grip 102 that may be pulled with one or both hands.

As a preferred aspect of the tool 80, the curved members 86, 88 are sized and shaped to encircle shaft 24 for movement thereon. Once united on shaft 24, ends of the curved members 86, 88 form a striking surface 62 for percussive engagement with the bearing 26. It should be noted that an inner radius or diameter, denoted by arrow C, of curved members 86, 88 that terminate in the striking surface 62 is related to the diameter of shaft 24 and an outer radius or diameter, denoted by arrow D, of curved members 86 and 88 that form striking surface 62 is related to the diameter of the inner and/or outer races 70, 72 of bearing 26. It is also important to note that the outer diameter D of striking surface 62 is preferably smaller than the diameter H of bearing housing 30, so the curved members 86, 88 can pass through the bearing housing 30 as it dislodges the bearing 26.

In use, the bearing removal tool 40, 80 is assembled on shaft 24 inside blower assembly housing 28. To remove bearing 26, tool 40, 80 is positioned rearwardly or aft of bearing 26, handles 60, 92 are gripped, and tool 40, 80 is yanked or pulled sharply outwardly from assembly housing 28 to bring striking surface 62 in contact with the inner race 70 and at least a portion of the outer race 72 of bearing 26. Typically, bearing 26 is dislodged and may be extracted after one use of tool 40, 80, but it may be slid rearwardly on shaft 24 and quickly and sharply pulled against bearing 26 again, if necessary.

Referring also to FIGS. 13 through 16, according to another aspect of the invention, the bearing removal tool 110 may include a body portion 112 having two members 114, 116 each including a curved receiving section 118 disposed centrally between outer sections. Tool 110 also includes an insert portion 122 having two members 124, 126 each including a curved collar 128 section sized and shaped for receipt in the curved receiving section 118 and a semi-circular section 130. In use, the two members of the insert portion 124, 126 are joined within the assembly housing 28 aft of the bearing 26 with the collar sections 128 inserted the receiving sections 118 of the two members of the body portion 114, 116, respectively. The semi-circular sections 130 abut around the shaft 24 to form a cylindrical member 132 having a terminal end defining a striking surface 134 with a thickness extending radially from the shaft 24.

Figure 13:
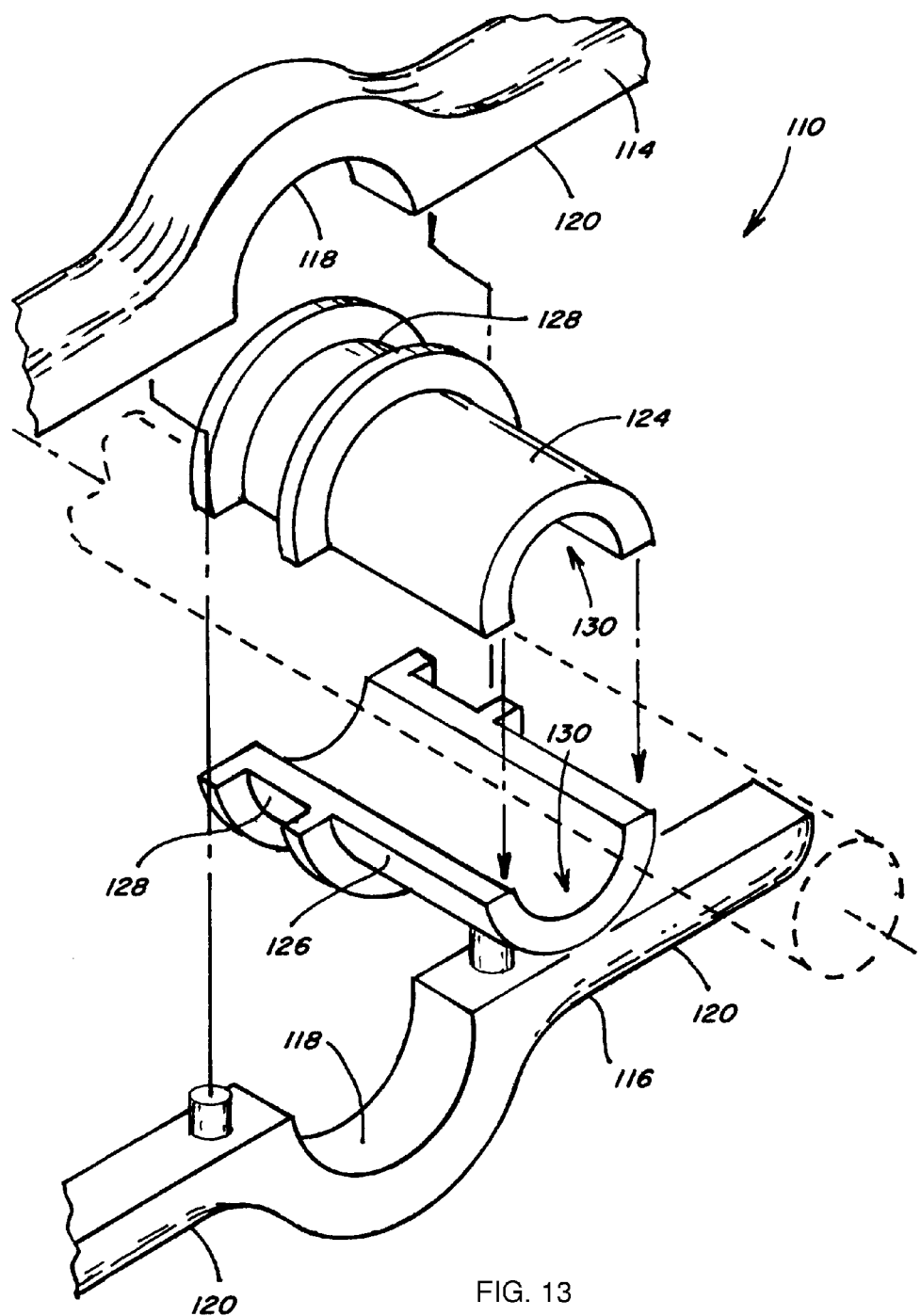
FIG. 13 is an exploded perspective view of yet another embodiment of the bearing removal tool.
Figure 14:
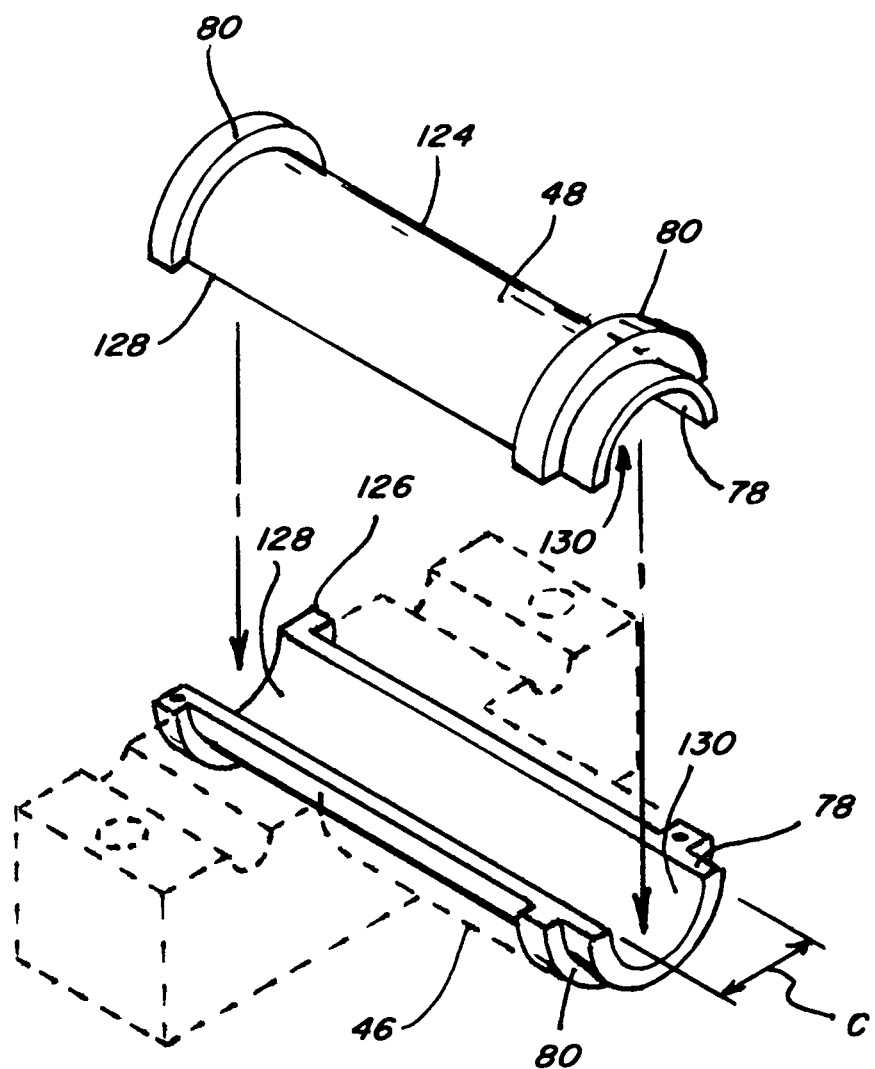
FIG. 14 is a partial perspective view of the bearing removal tool of FIG. 13.
Figure 15:
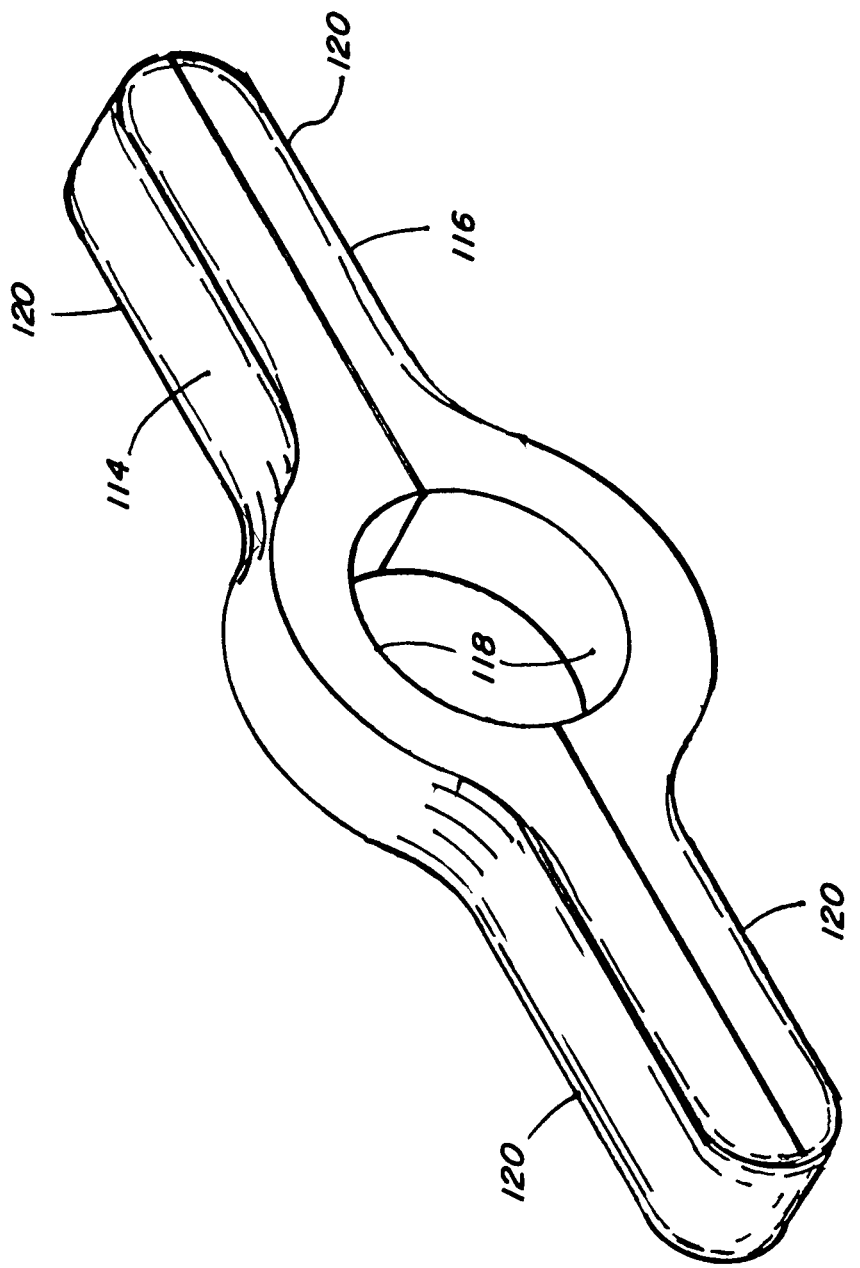
FIG. 15 is a perspective view of a body portion of the bearing removal tool of FIG. 13.
Figure 16:
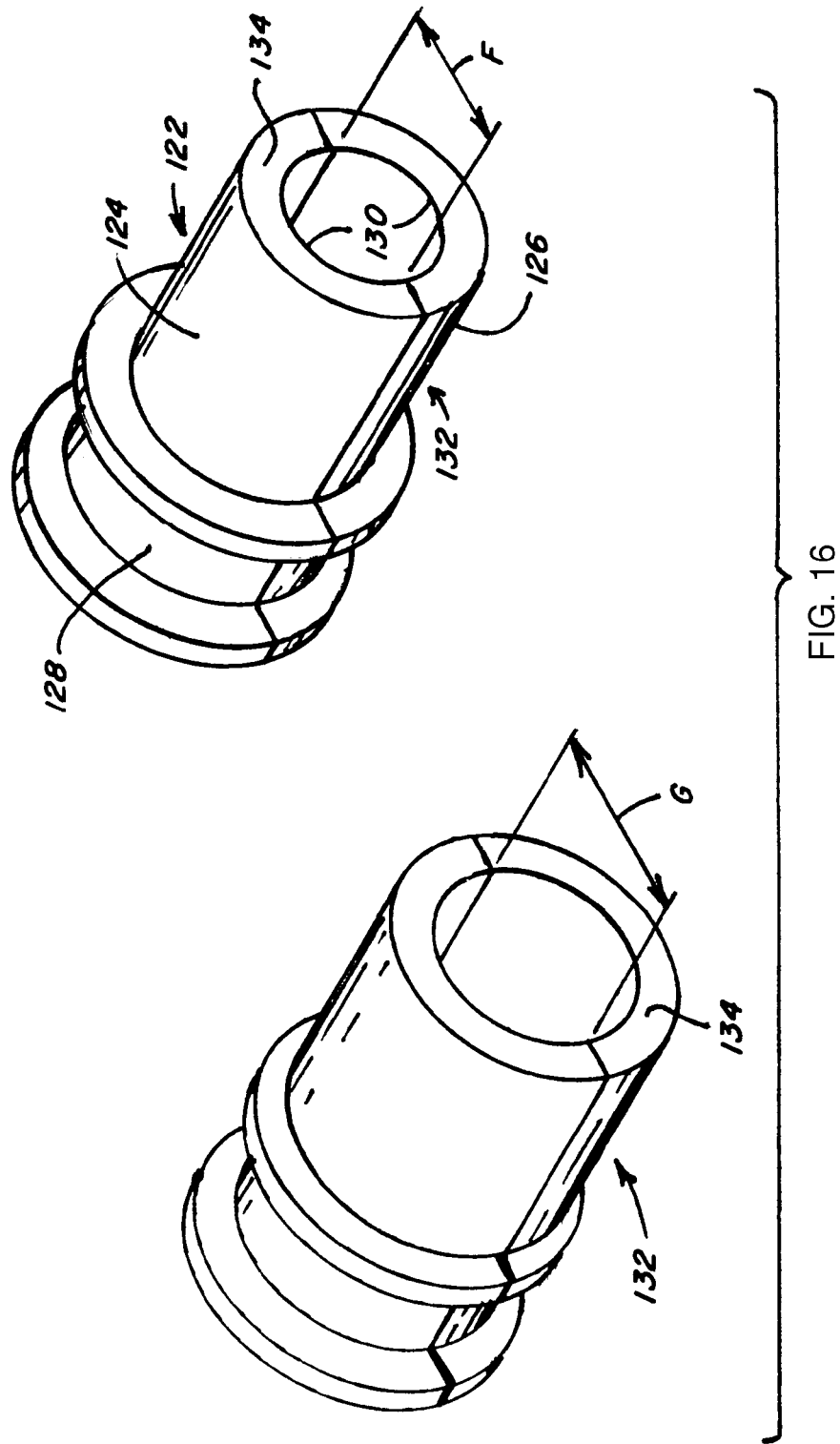
FIG. 16 is a perspective view of two representative insert portions of the bearing removal tool of FIG. 13.

According to another aspect of the invention, the tool 110 includes a plurality of insert portions. Each insert portion includes collar sections sized and shaped for receipt in the receiving sections of the body portion and semi-circular sections sized for encircling a plurality of shaft diameters. Two representative inserts, sized for shafts of diameters denoted F and G are shown in FIG. 13. The insert portion may be secured in the body portion using conventions attachment methods, such as, but not limited to, tape or hook and loop fabric.

As an advantage of the present invention, removal of bearings from a shaft is more easily and quickly accomplished. The need for heat or cutting tools is eliminated. In addition, no assembly or minimal assembly is required inside blower housing 28 where space and access are limited. Finally, striking surface 62 applies symmetric forces on the inner and outer races of bearing 26 to minimize torsion at bearing 26.

In light of all the foregoing, it should thus be apparent to those skilled in the art that there has been shown and described a bearing removal tool. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A tool for removing a bearing mounted within a bearing housing and about a shaft having a longitudinal center axis, the tool including:
  a striking element including a concave portion defining a recess sized for at least partially receiving the shaft, the striking element including a top, a bottom, a front end, a rear end, and a length extending between the front and rear ends, the front end including an opening to the recess and the bottom including an opening to the recess, the striking element having a shaft axis along which the longitudinal center axis of the shaft extends when the concave portion is on the shaft with the shaft received in the recess and extending out the front end of the striking element, the front end of the striking element defining a bearing striking surface facing forward; and a first handle and a second handle each secured to the striking element, the first handle including a first gripping surface for gripping by a first hand of a user, the second handle defining a second gripping surface for gripping by a second hand of the user, the first gripping surface including a first convex outward facing curved surface segment positioned for engagement by the first hand of the user, the second gripping surface including a second convex outward facing curved surface segment positioned for engagement by the second hand of the user, the first handle having a first cross-sectional shape defined by a cross section of the first handle taken in a plane extending parallel to the shaft axis, the first cross-sectional shape including a curved perimeter portion defined by the first convex outward facing curved surface segment, the second handle having a second cross-sectional shape defined by a cross section of the second handle taken in a plane extending parallel to the shaft axis, the second cross-sectional shape including a curved perimeter portion defined by the second convex outward facing curved surface segment, the handles configured and operable for positioning the concave portion of the striking element against the shaft with the shaft received in the recess thereby aligning the striking surface with the bearing such that quick, sharp outward movement of the tool exerts a generally normal force against at least a portion of the bearing sufficient to allow the bearing to be removed from the bearing housing.

2. The tool of claim 1, wherein the striking element is centrally disposed between the first and second handles.

3. The tool of claim 1, wherein the bearing striking surface surrounds more than half of a circumference of the shaft when the shaft is received in the recess.

4. The tool of claim 1, wherein the striking element is permanently secured to the handles.

5. The tool of claim 1, wherein
the bearing striking surface has an overall width smaller than an overall width of the bearing, and the bearing striking surface surrounds more than half of a circumference of the shaft when the shaft is received in the recess.

6. The tool of claim 5, wherein the bearing striking surface has a C-shaped outside edge including a curved outside upper edge segment and first and second opposing curved outside side edge segments, each curved outside side edge segment extending downward from the curved outside upper edge segment and away from the other of the first and second curved outside side edge segments and extending further downward and toward the other of the curved outside side edge segments.

7. The tool of claim 5, wherein the bearing striking surface has a U-shaped inside edge including an inside upper edge segment and first and second opposing inside side edge segments, the inside side edge segments being generally straight and extending in generally parallel relationship with each other downward from the inside upper edge segment.

8. The tool of claim 7, wherein a width of the recess extending between the inside side edge segments closely conforms to a diameter of the shaft.

9. The tool of claim 7, wherein the inside upper edge segment is curved.

10. The tool of claim 7, wherein the bearing striking surface has a C-shaped outside edge including a curved outside upper edge segment and first and second opposing curved outside side edge segments, each curved outside side edge segment extending downward from the curved outside upper edge segment and away from the other of the first and second curved outside side edge segments and extending further downward and toward the other of the curved outside side edge segments.

11. The tool of claim 5, wherein the first and second handles extend in generally opposite directions.

12. The tool of claim 1, wherein the curved perimeter portions of the first and second handles are rounded.

13. The tool of claim 1, wherein the first and second convex outward facing curved surface segments face generally rearward away from the bearing striking surface.

14. The tool of claim 1, wherein the cross-sectional shapes of the first and second handles are rounded.

15. The tool of claim 1, wherein rear sides of the first and second handles facing away from the bearing striking surface are rounded.

16. The tool of claim 1, wherein the first and second handles extend in generally opposite directions.

17. The tool of claim 16, wherein the first and second handles and the striking element form a T-shape.

18. The tool of claim 1, wherein the first and second handles are secured to the striking element adjacent the rear end of the striking element.

19. The tool of claim 1, wherein the first handle comprises an elongate first handle body including a first proximal portion and a first distal portion, the first handle being secured to the striking element at the first proximal portion, the second handle comprising an elongate second handle body including a second proximal portion and a second distal portion, the second handle being secured to the striking element at the second proximal portion, the first and second handle bodies having longitudinal axes extending laterally away from the shaft axis on respective first and second sides of the shaft axis, the first and second handle bodies being sized and shaped to permit a user to wrap the first hand around the first handle body on the first side of the shaft axis and to permit the user to wrap the second hand around the second handle body on the second side of the shaft axis.

20. The tool of claim 19, wherein the first handle has a first length extending from the first proximal portion to the first distal portion, the second handle has a second length extending from the second proximal portion to the second distal portion, and the striking element has a third length extending from the handles forward to the bearing striking surface, the first and second lengths being greater than the third length.

* * * * *